(12) United States Patent
Pokornowski et al.

(10) Patent No.: US 7,872,834 B1
(45) Date of Patent: Jan. 18, 2011

(54) HEAD SUSPENSION WITH ASYMMETRIC LINKAGE AND ASYMMETRIC MICROACTUATOR IN PLANE OF MOUNTING REGION TO PROVIDE A PSEUDOSYMMETRIC CONFIGURATION

(75) Inventors: Zachary A. Pokornowski, Cokato, MN (US); Ryan N. Ruzicka, Dassel, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 874 days.

(21) Appl. No.: 11/744,007

(22) Filed: May 3, 2007

(51) Int. Cl.
*G11B 5/58* (2006.01)
*G11B 21/24* (2006.01)
(52) U.S. Cl. .................. 360/294.4; 360/244.8; 360/245
(58) Field of Classification Search ............. 360/244.8, 360/245, 294.4, 294.3, 294.1, 294, 290, 240, 360/244, 244.2, 245.9, 78.05
See application file for complete search history.

(56) References Cited

U.S. PATENT DOCUMENTS

| 6,052,251 | A | 4/2000 | Mohajerani et al. ...... 360/78.05 |
| 6,157,522 | A | 12/2000 | Murphy et al. ............ 360/294.6 |
| 6,188,548 | B1 | 2/2001 | Khan et al. ............... 360/294.4 |
| 6,268,983 | B1 | 7/2001 | Imada et al. .............. 360/294.3 |
| 6,298,545 | B1 | 10/2001 | Mohajerani et al. ...... 29/603.03 |
| 6,661,619 | B2 * | 12/2003 | Nishida et al. ............ 360/294.4 |
| 6,680,825 | B1 | 1/2004 | Murphy et al. ............ 360/294.4 |
| 6,731,472 | B2 | 5/2004 | Okamoto et al. ......... 360/294.3 |
| 6,765,761 | B2 | 7/2004 | Arya ........................ 360/244.7 |
| 7,082,670 | B2 | 8/2006 | Boismier et al. .......... 29/603.06 |
| 7,177,119 | B1 | 2/2007 | Bennin et al. ............. 360/294.6 |
| 2002/0075606 | A1 * | 6/2002 | Nishida et al. ............ 360/294.4 |
| 2002/0089793 | A1 * | 7/2002 | Nakagawa et al. ........ 360/294.4 |
| 2004/0021989 | A1 * | 2/2004 | Ma ........................... 360/294.4 |
| 2005/0099736 | A1 * | 5/2005 | Utsunomiya .............. 360/294.4 |
| 2006/0256479 | A1 | 11/2006 | Yao et al. .................. 360/294.4 |
| 2006/0279880 | A1 | 12/2006 | Boutaghou et al. ........ 360/294.4 |
| 2010/0097726 | A1 * | 4/2010 | Greminger et al. ........ 360/294.4 |

FOREIGN PATENT DOCUMENTS

JP 2002093086 3/2002

* cited by examiner

*Primary Examiner*—Julie Anne Watko
(74) *Attorney, Agent, or Firm*—Faegre & Benson LLP

(57) ABSTRACT

A dual stage microactuated head suspension includes a base plate, a mounting region attached to the base plate, a load beam coupled to the mounting region, a flexure supported by the load beam and the mounting region, and a microactuator mechanically and electrically coupled to the mounting region. The mounting region is oriented in a plane and includes a microactuator slot for receiving the microactuator such that the microactuator lies substantially or entirely in the plane of the mounting region. The head suspension includes a microactuator support structure provided for mechanically and electrically coupling the microactuator to the mounting region.

5 Claims, 12 Drawing Sheets

HEAD SUSPENSION WITH ASYMMETRIC LINKAGE AND ASYMMETRIC MICROACTUATOR IN PLANE OF MOUNTING REGION TO PROVIDE A PSEUDOSYMMETRIC CONFIGURATION

TECHNICAL FIELD

The present invention relates to head suspension assemblies including microactuators for secondary actuation.

BACKGROUND

Dual-stage disk drive head suspension assemblies including one or more high resolution microactuators are known. Such head suspensions typically include a base plate for attaching the head suspension to a disk drive actuator, a mounting region attached to the base plate, a load beam attached or integral to the mounting region, and a flexure supported by the load beam for mounting a magnetic read/write head slider. The one or more microactuators are incorporated to accurately and quickly position the head slider over the desired track on the magnetic disk. The microactuators may typically be mounted on the base plate, the mounting region, the load beam, or the flexure.

In some cases, it may be sufficient, and indeed desirable, to utilize a single microactuator offset from the longitudinal centerline of the head suspension. While desirable from the standpoint of minimizing the number of microactuators, use of a single microactuator can create asymmetries about the longitudinal centerline of the suspension, which can in turn have undesirable effects. Even where multiple microactuators are utilized, it may be desirable to balance torsion modes and minimize the amount of resonance noise caused by incorporation of the microactuators.

There is thus a continuing need for improved microactuated head suspensions that can be efficiently and economically manufactured.

SUMMARY

The present invention is a microactuated disk drive head suspension having a pseudosymmetric configuration. In one embodiment, the head suspension comprises a proximal mounting region oriented in a plane and having a distal end portion and first and second major surfaces. A microactuator is located substantially in the plane of the mounting region and mechanically and electrically coupled to the mounting region. A microactuator support structure is provided for coupling the microactuator to the mounting region.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
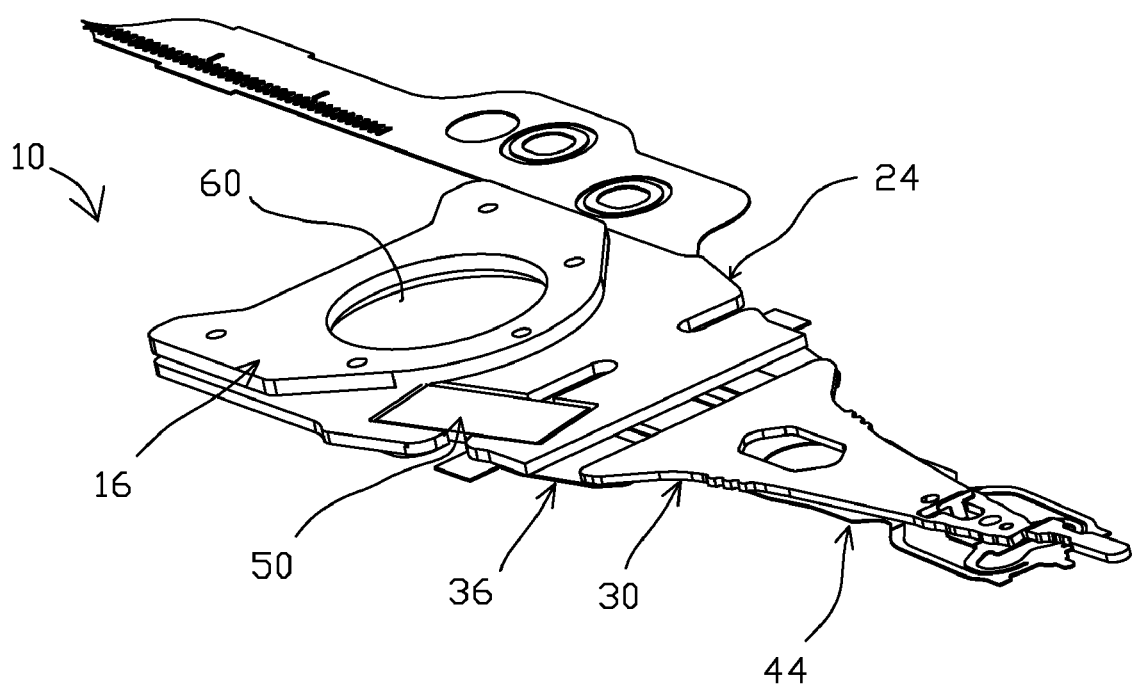
FIG. 1 is a perspective view of a disk drive head suspension according to one embodiment of the present invention.
Figure 2:
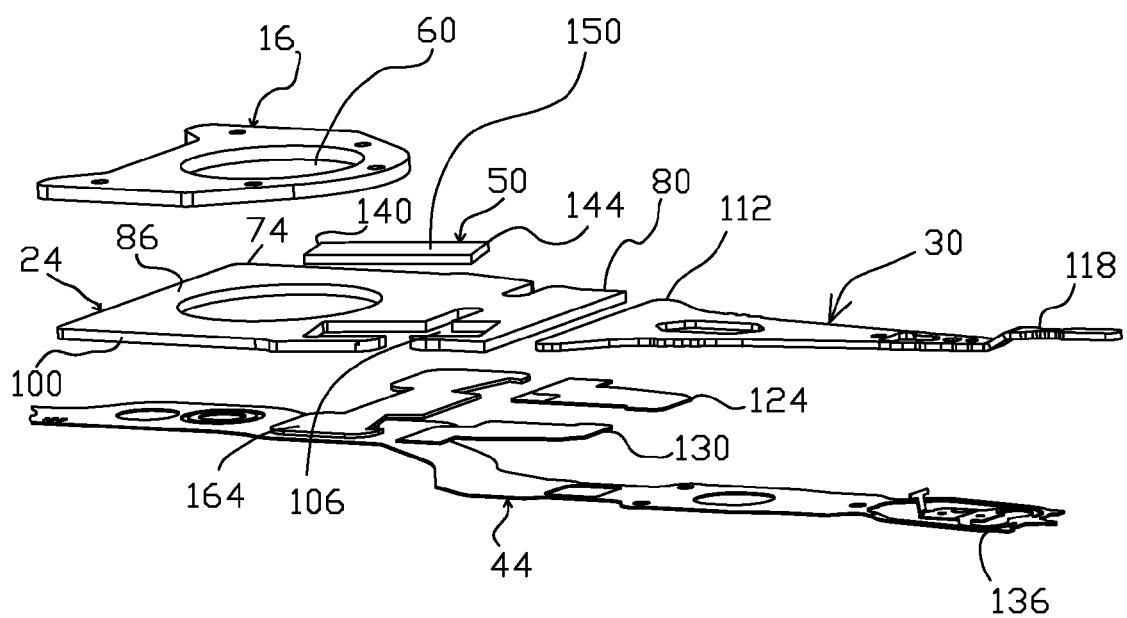
FIG. 2 is an exploded perspective view of the head suspension of FIG. 1.
Figure 3:
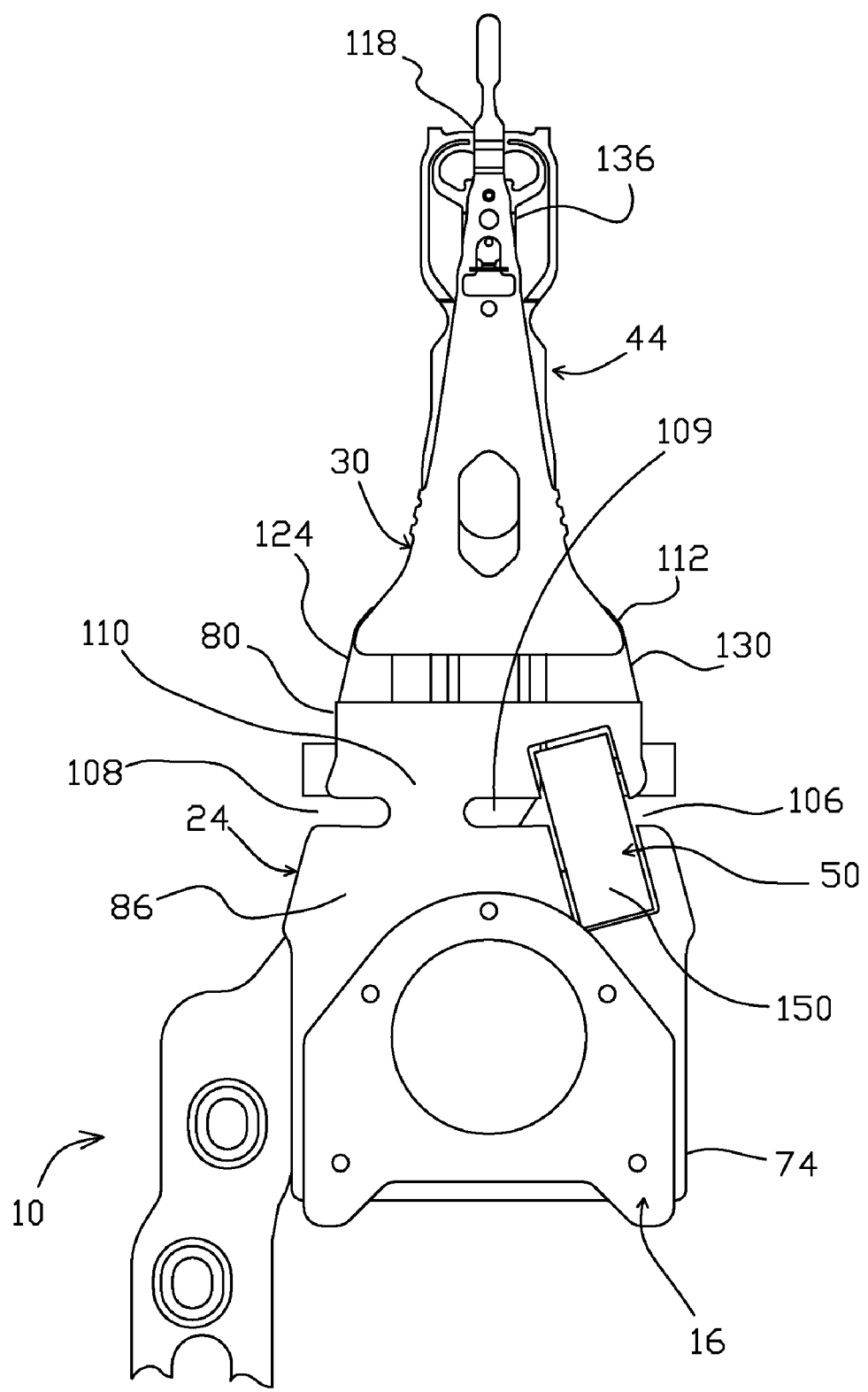
FIGS. 3 and 4 are plan views of opposite sides of the head suspension of FIG. 1.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIGS. 1-4 are perspective, exploded perspective, and top and bottom plan views, respectively, of a head suspension 10 according to one embodiment of the present invention. As shown, the head suspension 10 includes a base plate 16, a mounting region 24, a load beam 30, a hinge 36, a flexure 44, and a microactuator 50. The mounting region 24 is attached to the base plate 16, the load beam 30 is coupled to the mounting region 24 by the hinge 36, and the flexure 44 is attached to and supported by the mounting region 24 and the load beam 30. As shown, and as discussed in detail below, the microactuator 50 is positioned so as to be substantially co-planar to the mounting region 24. The head suspension 10 thus has a pseudosymmetric configuration. Such a configuration will substantially reduce or eliminate undesirable effects, e.g., off-track due to bending mode windage, that are sensitive to asymmetries present in conventional single-motor dual-stage head suspensions in which the single microactuator is mounted above the mounting region and load beam.

In the illustrated embodiment, the base plate 16 includes an opening 60, for mounting the head suspension 10 to a head suspension actuation system (not shown) as is known in the art. The base plate 16 operates to increase the stiffness of the mounting region 24 for securely mounting the head suspension 10 to the disk drive actuation system. In other embodiments, the base plate 16 and the mounting region 24 may be a monolithic structure. The base plate 16 further provides an electrical path to ground for the microactuator 50.

The mounting region 24 is generally planar and includes a proximal end portion 74, a distal end portion 80, and a pair of major surfaces 86, 94 separated by an edge surface 100. Additionally, the mounting region 24 includes a microactuator slot 106 through its thickness. As shown, the microactuator slot 106 is dimensioned to receive the microactuator 50 such that the microactuator 50 can be located substantially or entirely between the major surfaces 86, 94 of the mounting region 24. Additionally, the mounting region 24 includes a pair of transverse slots 108, 109 forming a linkage arm 110 coupling the proximal and distal end portions 74, 80. As further shown, the base plate 16 is attached to the major surface 86 of the mounting region 24.

The load beam 30 includes a proximal end 112 and a distal end 118, and extends distally relative to the mounting region 24. In the illustrated embodiment, the load beam 30 is generally planar and is oriented so as to be generally co-planar to the mounting region 24. In other embodiments, the load beam 30 may have other configurations. For example, in various embodiments, the load beam 30 may include stiffening rails or other features to enhance its stiffness. In other embodiments, the load beam 30 may be oriented out of plane with respect to the mounting region 24.

In the illustrated embodiment, the hinge 36 is a multi-piece element and includes a pair of hinge arms 124, 130 attached to the major surface 94 of the mounting region 24 and also to the load beam 30. The hinge arms 124, 130 are attached at their proximal ends to the distal end portion 80 of the mounting region 24, and at their distal ends to the proximal end 112 of the load beam 30. The hinge 36 thus operates to mechanically couple the load beam 30 to the mounting region 24. It is emphasized that the hinge 36 can take on any suitable configuration. For example, in other embodiments, the hinge 36 may have other configurations, e.g., may be a single, monolithic structure without separate hinge arms. In still other embodiments, the mounting region 24, the load beam 30, and the hinge 36 may be a unitary, monolithic structure formed from a single piece of material.

The flexure 44 can be of any suitable design and construction. In the illustrated embodiment, the flexure 44 includes a distal gimbal region 136 to which a magnetic head slider (not shown) can be attached. The flexure 44 includes one or more conductive traces (not shown) for electrically coupling the head slider to the disk drive electrical circuitry. The gimbal region 136 is located generally adjacent to the distal end 118 of the load beam 30, and is designed to be resiliently moveable with respect to the remainder of the flexure in response to the aerodynamic forces generated as the magnetic disk rotates relative to the head slider.

In the illustrated embodiment, the microactuator 50 is also generally planar and includes a proximal end portion 140, a distal end portion 144, and surfaces 150 and 156 opposite one another. As shown, the microactuator 50 is located in the microactuator slot 106 of the mounting region 24 and in the plane of the mounting region 24 and the load beam 30.

Figure 4:
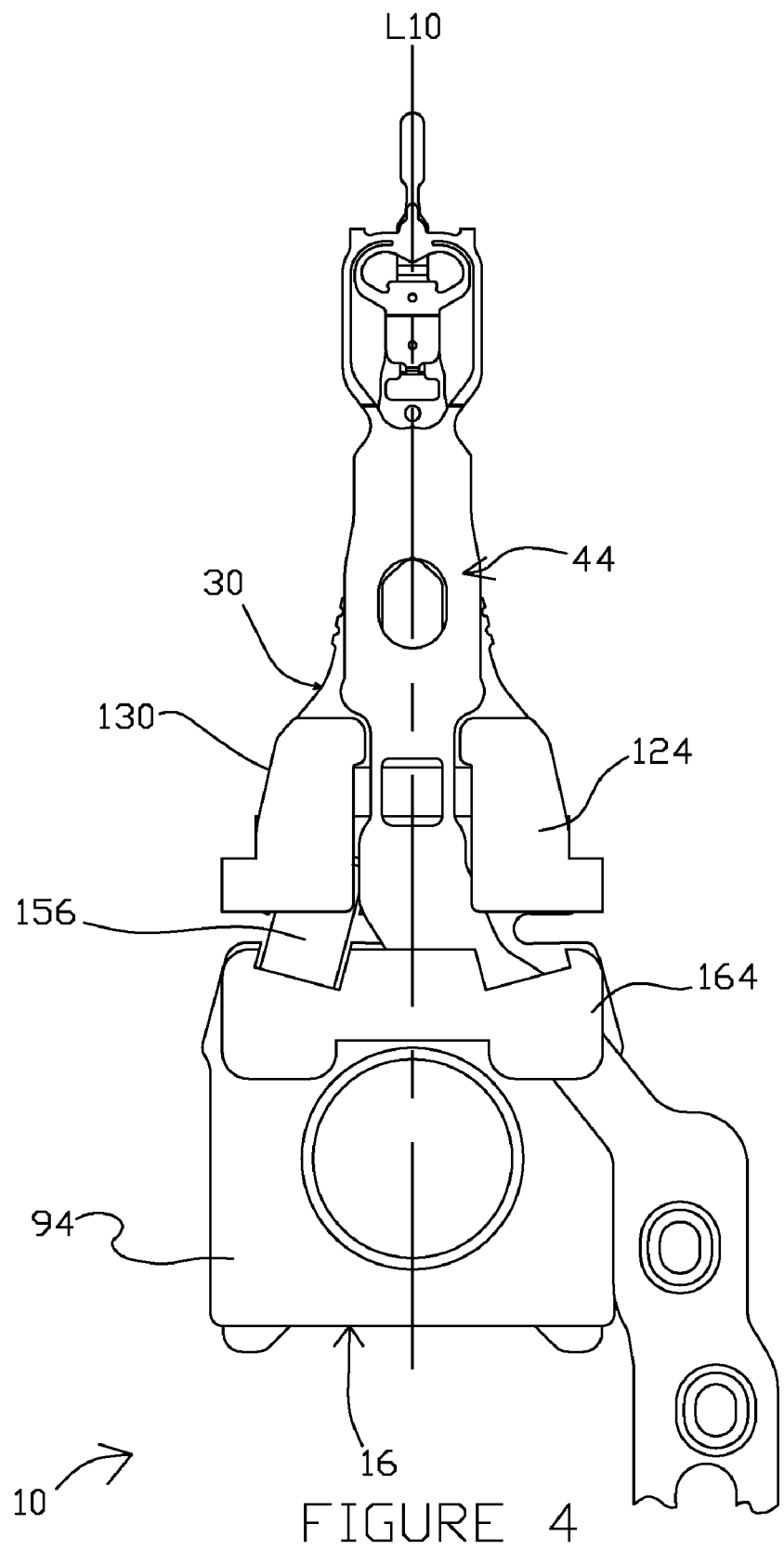
Figure 5:
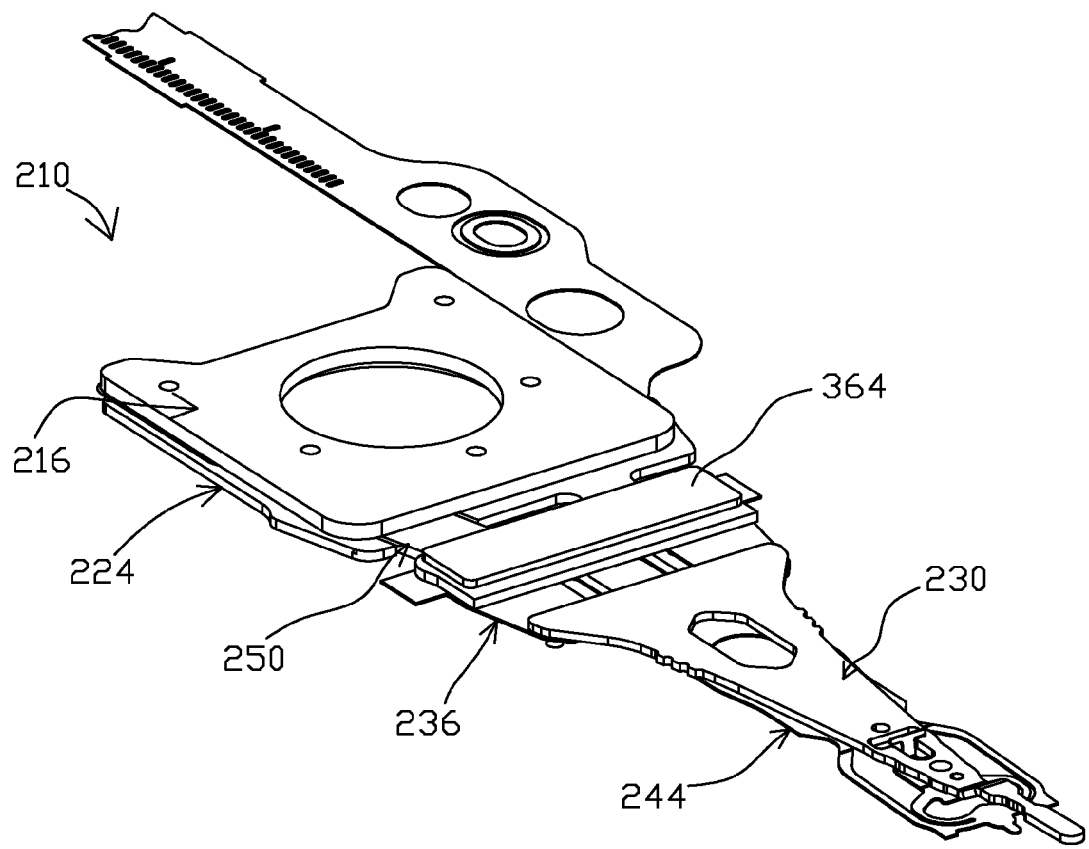
FIG. 5 is a perspective view of a disk drive head according to another embodiment of the present invention.
Figure 6:
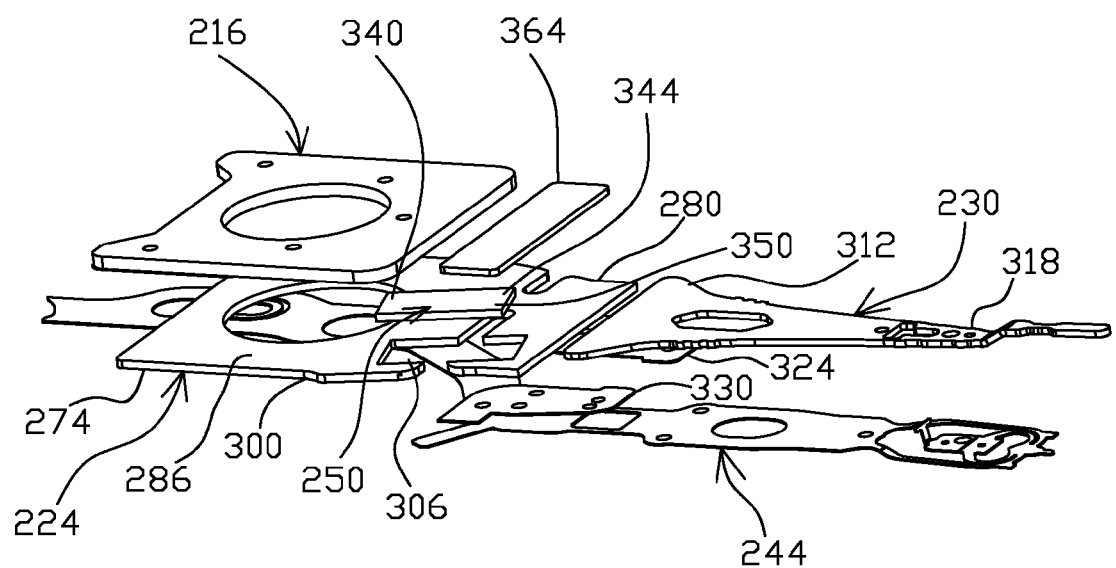
FIG. 6 is an exploded perspective view of the head suspension of FIG. 5.

As can be seen in FIG. 4, the head suspension 10 further includes a cross-member 164 attached to the major surface 94 of the mounting region 24 and oriented generally transverse to the longitudinal centerline L10 (see FIG. 4) through the mounting region 24 and the load beam 30. As further shown, the proximal end portion 140 of the microactuator 50 is attached to and supported by the cross member 164, while the distal end portion 144 of the microactuator 50 is attached to and supported by the hinge arm 130. Thus, in the illustrated embodiment, the hinge arm 130 and the cross member 164 operate as a microactuator support structure for mechanically coupling the microactuator 50 to the head suspension 10. In various other embodiments, the cross member 164 may be a part of the hinge 36 (i.e., may be integral to or attached directly to one or both of the hinge arms 124, 130).

The microactuator 50 can be any suitable head suspension microactuator, whether now known or later developed. In the illustrated embodiment, the microactuator 50 is a piezoelectric microactuator including a piezoelectric layer of lead zirconium titanate. As will be appreciated, in such a microactuator, the surfaces 150, 156 include one or more electrodes (not shown) for electrically coupling the microactuator 50 to a power supply and to ground. In other embodiments, the microactuator 50 may include multiple piezoelectric layers and/or may include different piezoelectric materials as are known in the art.

The principles of operation of piezoelectric microactuators are well known and need not be repeated in detail. In short, an applied electrical voltage across the piezoelectric device causes it to expand or contract, thereby causing deformation of the relatively resilient distal end portion 80 of the mounting region 24. Because the base plate 16 is relatively stiff and rigid, such deformation of the mounting region 24 is transmitted substantially entirely toward the relatively rigid load beam 30, and in turn, causes the gimbal region 136 of the flexure 44 to deflect. This deflection provides high resolution positioning of the head slider mounted to the gimbal region 136 in a direction transverse to the axis L10.

In the illustrated embodiment, electrical power to the microactuator 50 can be supplied through a conductive jumper (not shown) extending from a flexure lead (not shown) to the electrode(s) on the surface 150 of the microactuator 50. The electrodes on the other surface 156 of the microactuator 50 are electrically coupled to ground via the hinge arm 130 and/or the cross member 164, the mounting region 24, and the base plate 16, thereby completing the electrical circuit. Alternatively, leads (not shown) can be utilized to electrically power the microactuator 50 and/or to electrically ground the microactuator.

The base plate 16, the mounting region 24, the load beam 30, the hinge 36, and the cross member 164 may be made of any material having suitable mechanical properties for use in disk drive head suspensions. In various embodiments, these components may also be electrically conductive so as to facilitate electrically coupling the microactuator 50 to ground. In one embodiment, these components are made from stainless steel. In still other embodiments, one or more of the base plate 16, the mounting region 24, the load beam 30, the hinge 36, and the cross member 164 may be made of a material that is not electrically conductive, and the microactuator can be electrically grounded by inclusion of separate leads or traces (not shown). The hinge 36 may be attached to the load beam 30 and the mounting region 24, and the cross member 164 may be attached to the mounting region 24, by any suitable method providing sufficient strength and electrical conductivity. Similarly, the base plate 16 and the mounting region 24 may be coupled using any suitable method. In various embodiments, these components may be attached together by welding, soldering, or brazing.

The microactuator 50 may also be mechanically and/or electrically coupled to the hinge arm 130 and the cross member 164 using any suitable technique. In one embodiment, these components are adhesively bonded in such a manner so as to provide electrical contact between the electrode(s) on the surface 156 and the hinge arm 130 and/or the cross member 164. In one embodiment, the microactuator 50 may also be directly bonded or otherwise fixedly attached directly to the mounting region 24.

The novel configuration of the illustrated embodiment and the other various embodiments of the present invention provide a dual-stage microactuated head suspension in which the microactuator 50 is located substantially or entirely in the same plane as the mounting region 24. Thus, the inclusion of the microactuator 50 does not significantly increase the Z-height dimension (i.e., the dimension transverse to the axis L10, see FIG. 4) of the mounting region 24 such that the mounting region 24 is effectively symmetrical on both sides of the axis L10. Accordingly, the head suspensions of the present invention are pseudosymmetric designs.

The head suspension 10 has significant advantages over conventional microactuated head suspensions in which the microactuator is mounted above the load beam and mounting region, thus resulting in an asymmetric design. In particular, the pseudosymmetric head suspension 10 will exhibit reduced resonance noise as compared with the foregoing asymmetric head suspensions.

To manufacture and assemble the head suspension 10, the mounting region 24 and the load beam 30 can be formed using any suitable technique, e.g., etching, with the additional step of the formation of the microactuator slot 106 in the mounting region 24 for receiving the microactuator 50. As will be appreciated, the base plate 16, the hinge 36, the flexure 44, and the cross member 164 can be formed using any known methods. The flexure 44, the mounting region 24, the load beam 30, the hinge 36, and the cross member 164 can then be assembled and attached together as shown and described above, e.g., by welding, according to the preference of the manufacturer. Thereafter, the microactuator 50 can be positioned in the microactuator slot 106 and attached to the hinge arm 130 and the cross member 164 using, for example, an adhesive or other technique providing both a mechanical and/or electrical bond between the microactuator 50 and the hinge arm 130 and/or the cross member 164. The microactuator 50 can then be electrically coupled to the flexure 44 by forming, e.g., wire stitching, one or more jumpers between the flexure traces and the microactuator 50.

FIGS. 5-8 illustrate a head suspension 210 according to another embodiment of the present invention. As shown, the head suspension 210 includes a base plate 216, a mounting region 224, a load beam 230, a hinge 236, a flexure 244, and a microactuator 250. The mounting region 224 is attached to the base plate 216, the load beam 230 is coupled to the mounting region 224 by the hinge 236, and the flexure 244 is attached to and supported by the mounting region 224 and the load beam 230. Except as discussed below, the base plate 216, the mounting region 224, the load beam 230, the hinge 236, the flexure 244, and the microactuator 250 are configured in substantially the same or identical manner as the corresponding features of the head suspension 10. In particular, the microactuator 250 is positioned so as to be substantially or entirely within the plane of the mounting region 224 and the load beam 230, thereby providing a pseudosymmetric design exhibiting reduced resonance noise as described above with respect to the head suspension 10.

As shown, the mounting region 224 includes a proximal end portion 274, a distal end portion 280, and a pair of major surfaces 286, 294 separated by an edge surface 300. Additionally, the mounting region 224 includes a microactuator slot 306 through its thickness. As with the corresponding feature of the mounting region 24 described above, the microactuator slot 306 is dimensioned to receive the microactuator 250 such that the microactuator 250 can be located substantially or entirely between the major surfaces 286, 294, and thus substantially or entirely in the same plane as the mounting region 224. Additionally, the mounting region 224 includes a pair of transverse slots 308, 309 forming a linkage arm 310 coupling the proximal and distal end portions 274, 280.

The load beam 230 includes a proximal end 312 and a distal end 318, and extends distally relative to the mounting region 224. In the illustrated embodiment, the load beam 230 is generally planar (except at its distal tip, as shown) and is oriented so as to be generally co-planar to the mounting region 224. In other embodiments, the load beam 230 may have other configurations, such as described above in connection with the load beam 30 of the head suspension 10. As further shown, the hinge 236 is a multi-piece element and includes a pair of hinge arms 324, 330 attached to the major surface 294 of the mounting region 224 and also to the load beam 230. The hinge 236 thus operates to mechanically couple the load beam 230 to the mounting region 224. Like the hinge 36 of the head suspension 10, the hinge 236 can take on any suitable configuration. The microactuator 250 is also configured substantially the same as the microactuator 50 and is generally planar and includes a proximal end portion 340, a distal end portion 344, and surfaces 350 and 356 opposite one another.

Figure 7:
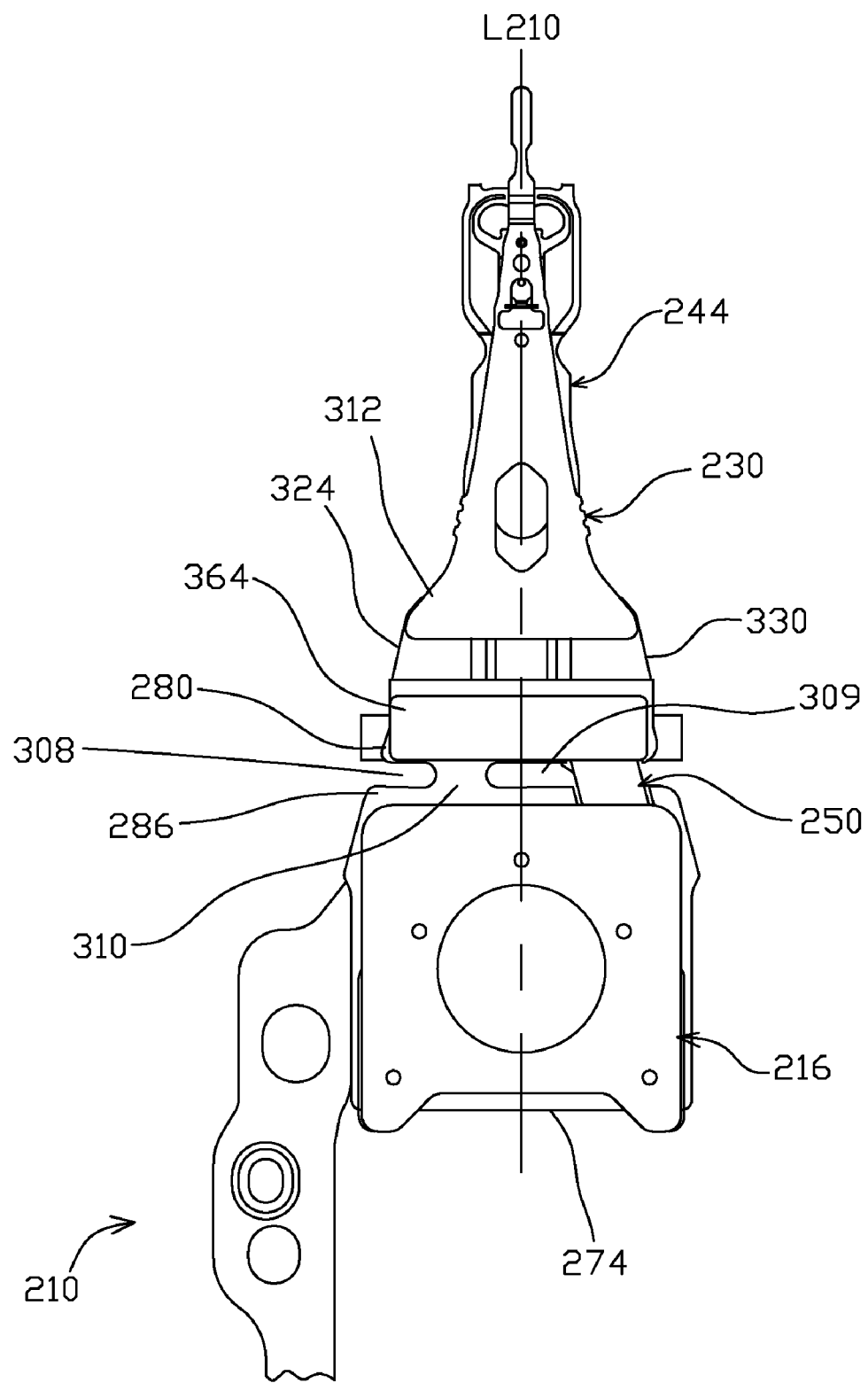
FIGS. 7 and 8 are plan views of opposite sides of the head suspension of FIG. 5.

As shown in FIG. 7, the head suspension 210 further includes a cross member 364 attached to the major surface 286 of the mounting region 224 and extending generally transverse to the longitudinal centerline L210 of the mounting region 224 and the load beam 230. The cross member 364 can be made of any suitable material, such as those described above with respect to the cross member 164 of the head suspension 10. In various embodiments, the cross member 364 may be made from the same material as the base plate 216, the mounting region 224 and/or the load beam 230.

In the illustrated embodiment, the microactuator 250 is positioned in the mounting region microactuator slot 306 and its surface 350 is attached at its proximal end portion 340 to the base plate 216 and at its distal end portion 344 to the cross member 364. The base plate 216 and the cross member 364 thus operate as a microactuator support structure for supporting the microactuator 250 and coupling the microactuator 250 to the mounting region 224. In some embodiments, the base plate 216 and/or the cross member 364 may also be electrically coupled to the microactuator 250 so as to provide an electrical path to ground.

In some embodiments, the microactuator 250 is substantially free from any mechanical contact with the hinge 236. Even if some contact between the microactuator 250 and the hinge 236 does occur, in the embodiment of FIGS. 5-8, these components are not directly fixedly attached to one another. Although in the illustrated embodiment, the base plate 216 and the cross member 364 are separate elements and in other embodiments, they may be integrally formed as part of a monolithic structure.

Figure 8:
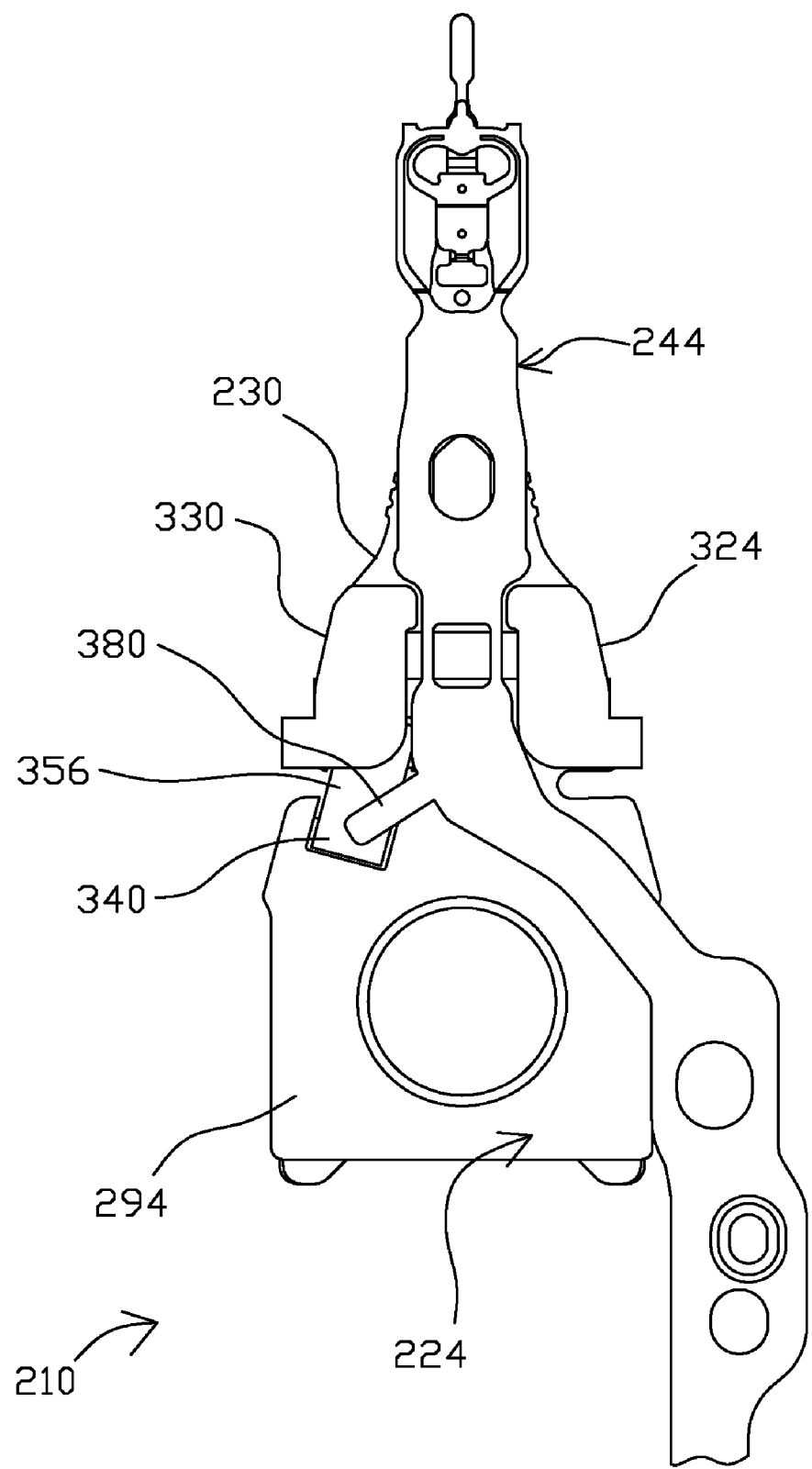

As can be seen in FIG. 8, the flexure 244 includes a conductive lead 380 extending to and electrically contacting the adjacent surface 356 of the microactuator 250. Electrical power to the microactuator 250 is provided from the flexure 244 through the conductive lead 380. This novel configuration thus eliminates the need for forming a separate jumper extending from the flexure 244 to the microactuator 250, because the opposite surface 350 is electrically coupled to ground via the base plate 216. The lead 380 can be formed integrally with the flexure 244 in general, thus simplifying the manufacturing process for the head suspension 210 as compared with head suspensions requiring a separate jumper to be formed after the microactuator is attached thereto.

Figure 9:
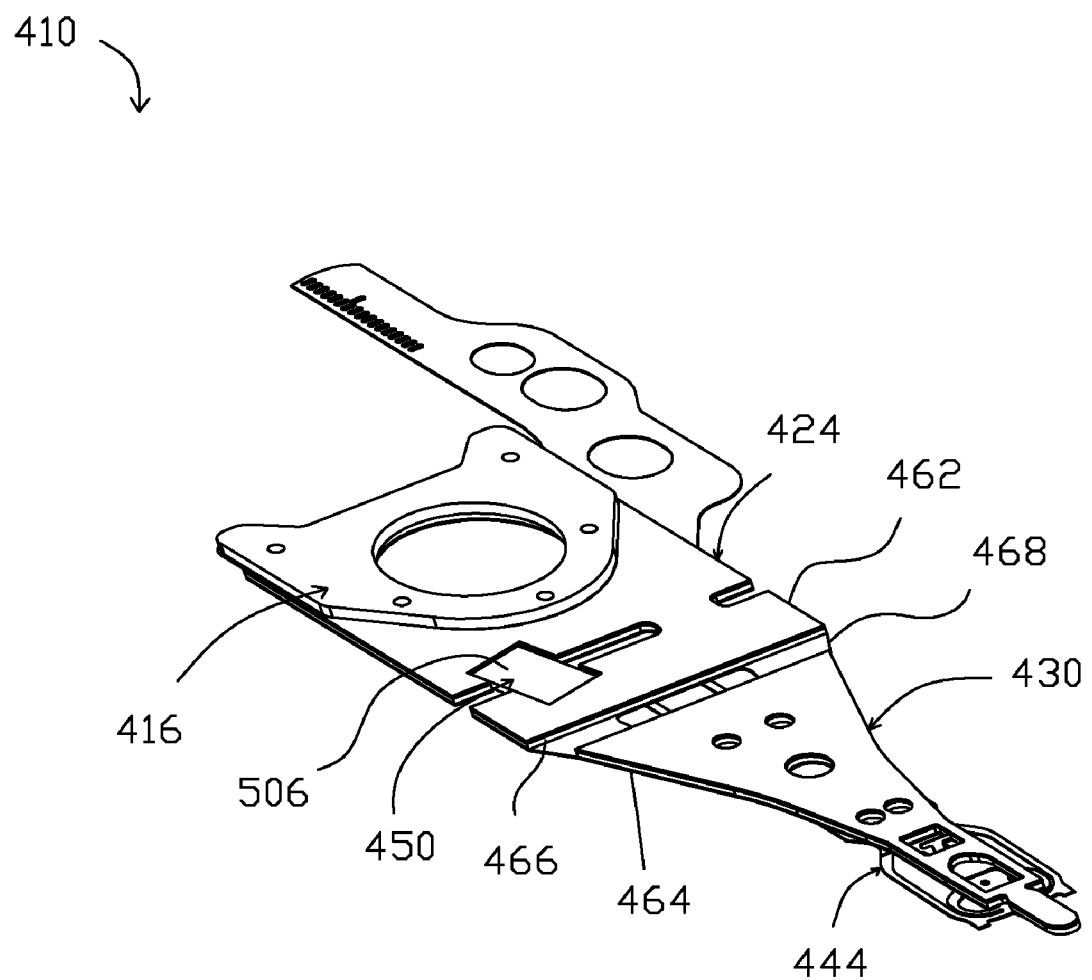
FIG. 9 is a perspective view of a disk drive head suspension according to yet another embodiment of the present invention.
Figure 10:
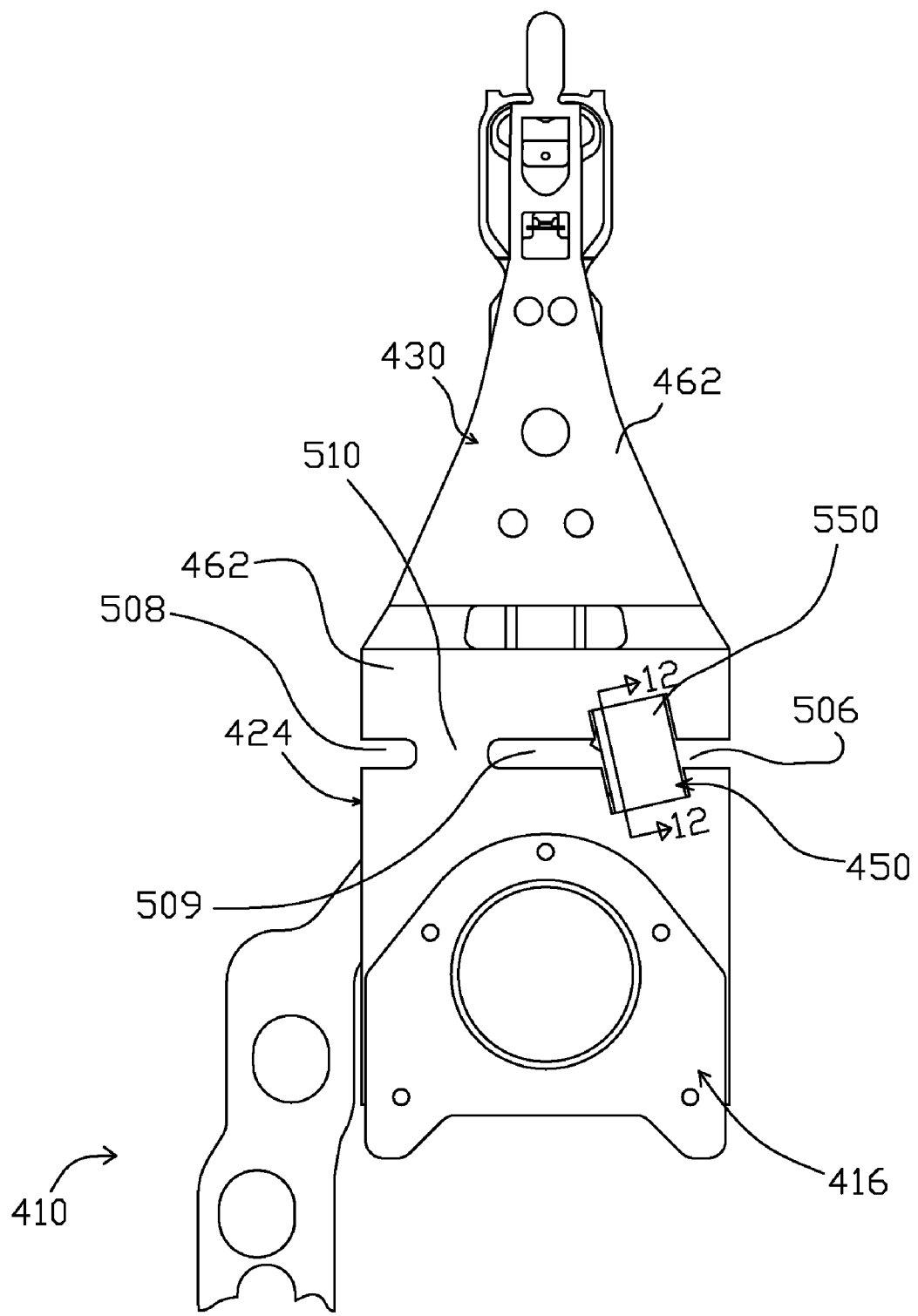
FIGS. 10 and 11 are plan views of opposite sides of the head suspension of FIG. 9.
Figure 11:
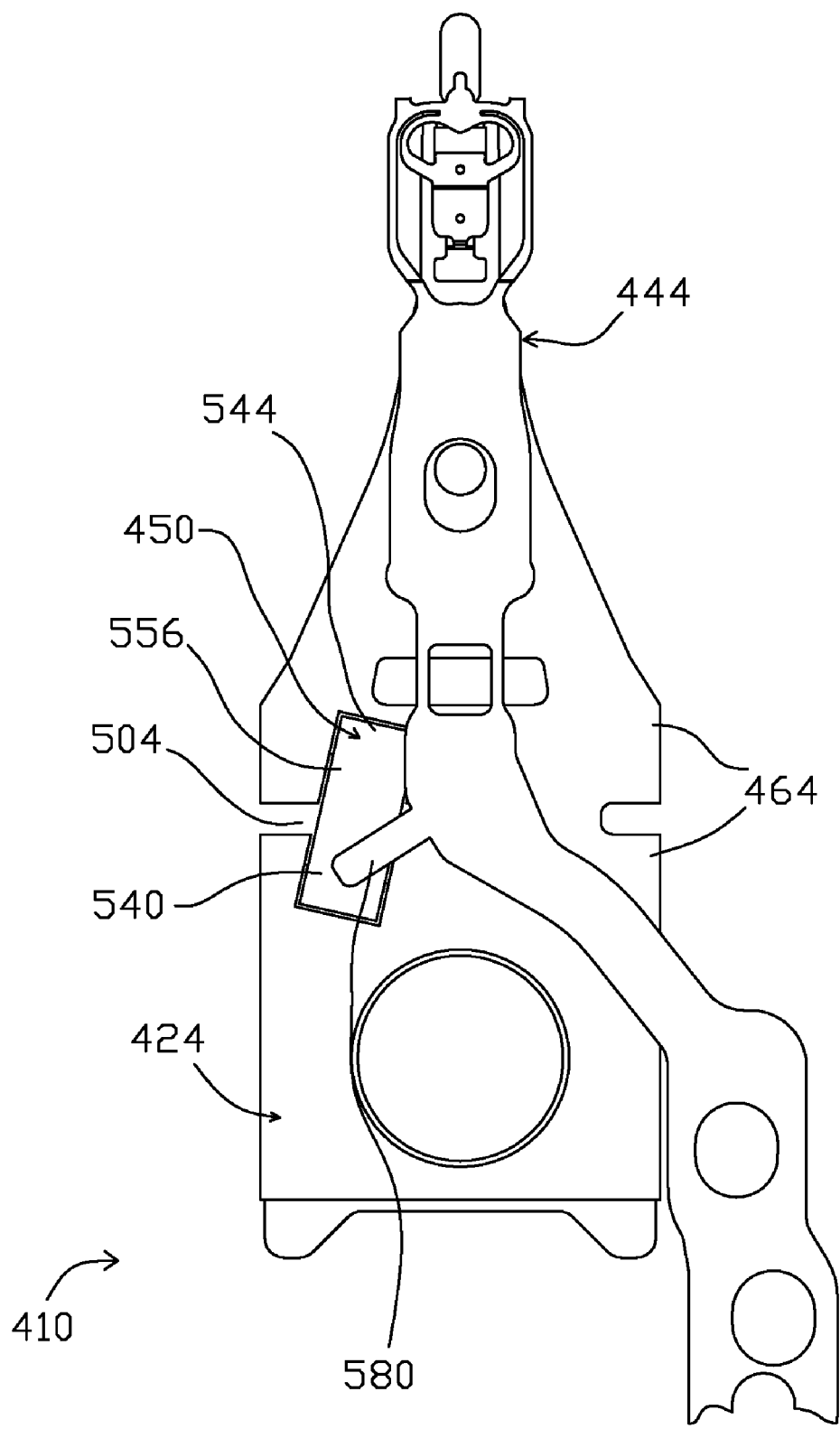
Figure 12:
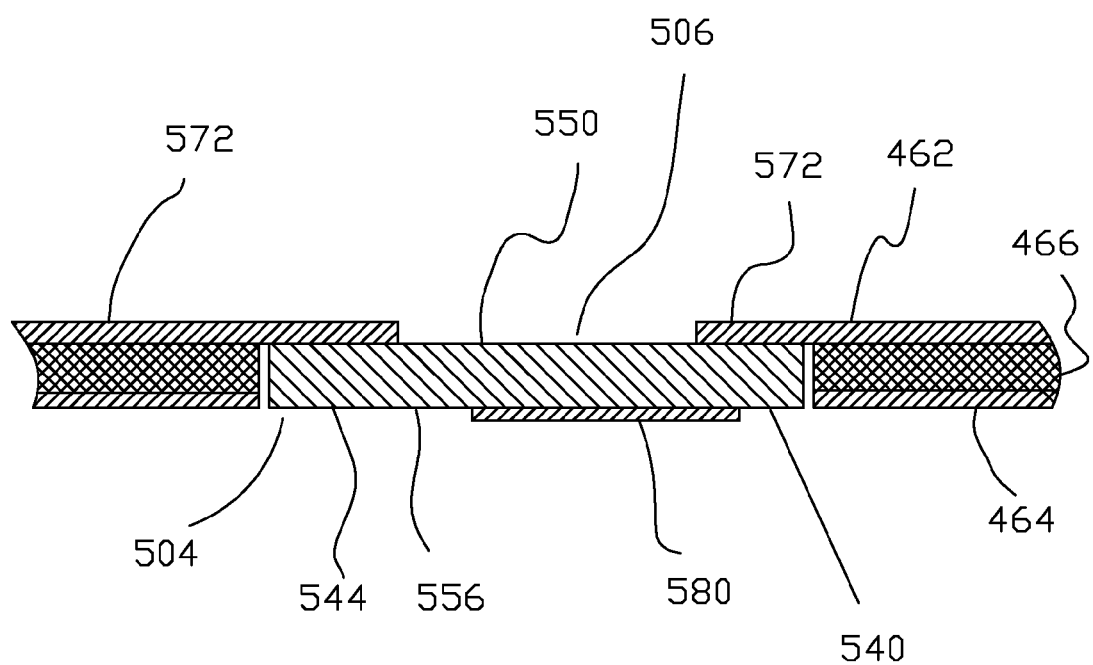
FIG. 12 is a partial cross-sectional elevation view of a portion of the head suspension of FIG. 9 taken along the line 12-12 in FIG. 10.

FIGS. 9-11 are perspective, top plan and bottom plan views, respectively, of a head suspension 410 according to another embodiment of the present invention, and FIG. 12 is a cross-sectional elevation view of a portion of the head suspension 410 taken along the line 12-12 in FIG. 10. As shown, the head suspension 410 includes a base plate 416, a mounting region 424 attached to the base plate 416, a load beam 430, a flexure 444, and a microactuator 450. The base plate 416 and the flexure 444 may be configured to be substantially the same as or identical to the corresponding structures of the head suspension 10 described above. As with the flexures 44, 244 of the head suspensions 10, 210, the flexure 444 is attached to and supported by the mounting region 424 and the load beam 430.

In the illustrated embodiment, the mounting region 424 and the load beam 430 are formed from a laminate structure including a pair of stainless steel layers 462, 464 separated by a dielectric layer 466. The dielectric layer 466 may be made from polyimide or any other suitable dielectric material. Portions of the stainless steel layers 462, 464 and the dielectric layer 466 are selectively removed to form the mounting region 424 and the load beam 430. The laminate mounting region 424 and the load beam 430 can be formed by any known process, e.g., photolithography, used for forming laminate load beams and the like. As shown, the head suspension 410 includes a spring region 468 extending between and joining the mounting region 424 and the load beam 430. The spring region 468 is formed from the stainless steel layer 464 by etching away the adjacent portions of the stainless steel layer 462 and the dielectric layer 466.

As further shown, the mounting region 424 includes a pocket 504 formed through the stainless steel layer 464 and the dielectric layer 466, and a microactuator slot 506 formed through the stainless steel layer 462 and positioned and substantially centered over the pocket 504. Additionally, the mounting region 424 includes a pair of transverse slots 508, 509 forming a linkage arm 510 coupling the proximal and distal end portions 474, 480.

As with the embodiments described above, the microactuator 450 is generally planar and includes proximal and distal end portions 540, 544, a surface 550, and a surface 556 opposite the surface 550. As shown in FIG. 11, the pocket 504 in the stainless steel layer 464 and the dielectric layer 466 is dimensioned such that the microactuator 450 can be received therein. As can be seen in the cross-sectional view of FIG. 12, the microactuator slot 506 in the stainless steel layer 462 has a length smaller than that of the pocket 504 and the microactuator 450, forming tabs 572 in the stainless steel layer 462 extending over the pocket 504. Thus, in the illustrated embodiment, the proximal and distal end portions 540, 544 of the microactuator 450 are mechanically and electrically coupled to the tabs 572 of the stainless steel layer 462, which thereby operates to electrically couple the microactuator 450 to ground via the base plate 416 (see FIG. 9).

Additionally, as shown in FIGS. 11 and 12, the flexure 444 includes a conductive lead 580 electrically coupled to the microactuator surface 556 located adjacent to flexure 444 and the stainless steel layer 464. As with the flexure 244 of the head suspension 210 described above, the electrical power to the microactuator 450 can be provided through the flexure 444 and the conductive lead 580. Accordingly, the head suspension design of FIGS. 9-11 similarly eliminates the need for forming a separate jumper extending from the flexure 444 to the surface of the microactuator 450 located opposite the flexure 444 after the microactuator 450 and the flexure 444 are attached to the head suspension 410.

As discussed above, the various embodiments of the present invention have significant advantages over conventional microactuated head suspensions. In particular, the pseudosymmetric configurations of the single-microactuator head suspension embodiments described above will exhibit reduced resonance noise and more balanced torsion modes as compared to conventional head suspensions in which the microactuator motor is positioned above the load beam and mounting region. The pseudosymmetric configurations of the head suspension 210 and 410 will thus substantially reduce or eliminate off windage-induced off-track as compared with conventional asymmetric single microactuator head suspensions. Additionally, as described above, the head suspensions 210 and 410 have the additional advantage of eliminating the need for forming separate electrical jumpers to electrically couple the microactuator to the flexure traces after attaching the microactuator to the head suspension. Thus, a significant manufacturing cost reduction can be achieved utilizing the novel designs described above.

It is emphasized that while the embodiments described above employ a single microactuator, the substantially coplanar microactuator configuration may also be utilized in head suspensions employing two or more microactuators. That is, the novel head suspensions according to the various embodiments of the present invention may include more than one microactuator without departing from the scope of the invention. For example, those skilled in the art will appreciate that elimination of these jumpers will also be desirable with respect to head suspensions employing two or more microactuators.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A head suspension having a longitudinal center line axis, comprising:
    a proximal mounting region having a first side, a second side opposite the first side from the center line axis, a first outer edge on the first side, a second outer edge on the second side, a distal end portion and a proximal end portion separated from the distal end portion by transverse slots extending into the first and second sides from the first and second outer edges, a linkage extending between the distal and proximal end portions at an asymmetric position with respect to the center line axis only on the first side at a location spaced from the first outer edge, first and second major surfaces defining a plane therebetween, and a single microactuator slot extending from the first major surface to the second major surface between the distal and proximal end portions at an asymmetric position with respect to the center line axis only on the second side;
    a single microactuator located within the microactuator slot substantially in the plane of the mounting region to provide a pseudosymmetric configuration;
    a microactuator support structure for fixedly coupling the microactuator to the distal and proximal end portions of the mounting region on the second side of the mounting region;
    a load beam coupled to the distal end portion of the mounting region; and
    a flexure attached to and supported by the load beam for supporting a magnetic head slider.

2. The head suspension of claim 1 wherein the microactuator is located between the first and second major surfaces of the mounting region.

3. The head suspension of claim 2 wherein the microactuator support structure includes a cross member mounted to the proximal end portion of the mounting region and a hinge arm, the hinge arm further attached to the load beam to couple the load beam to the mounting region.

4. The head suspension of claim 3 wherein the microactuator includes:
    a proximal end portion fixedly attached to the cross member; and
    a distal end portion fixedly attached to the hinge arm.

5. The head suspension of claim 1 wherein the microactuator support structure is attached to the microactuator and the second major surface of the mounting region.

* * * * *